Patented Sept. 13, 1949

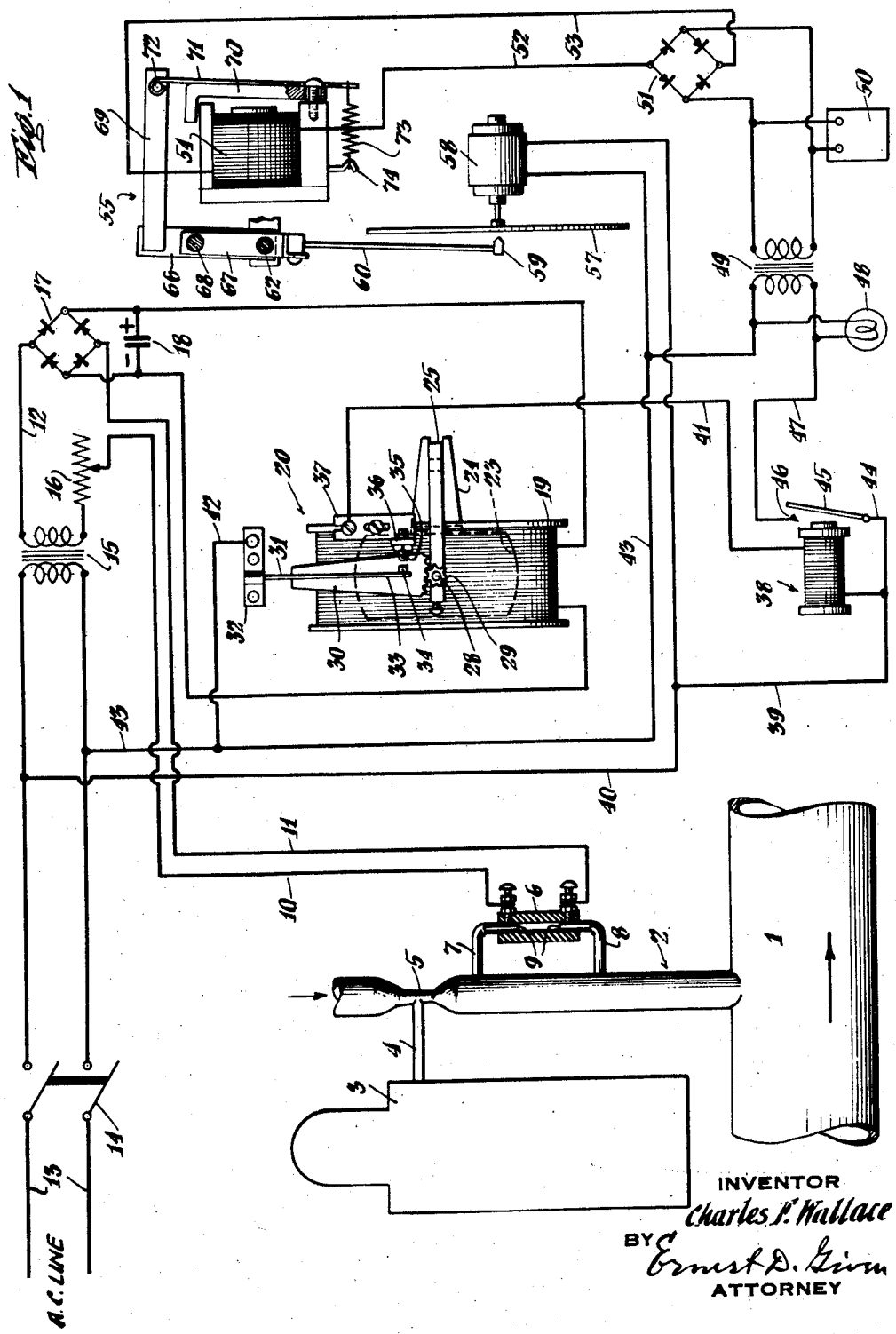

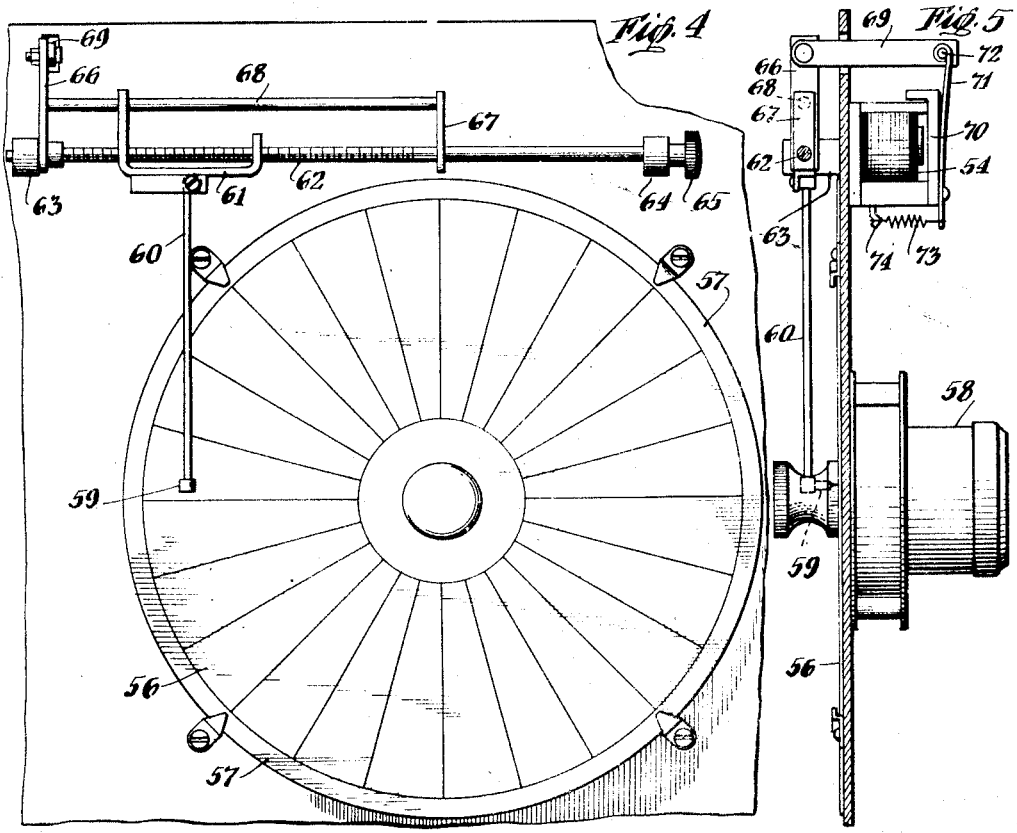
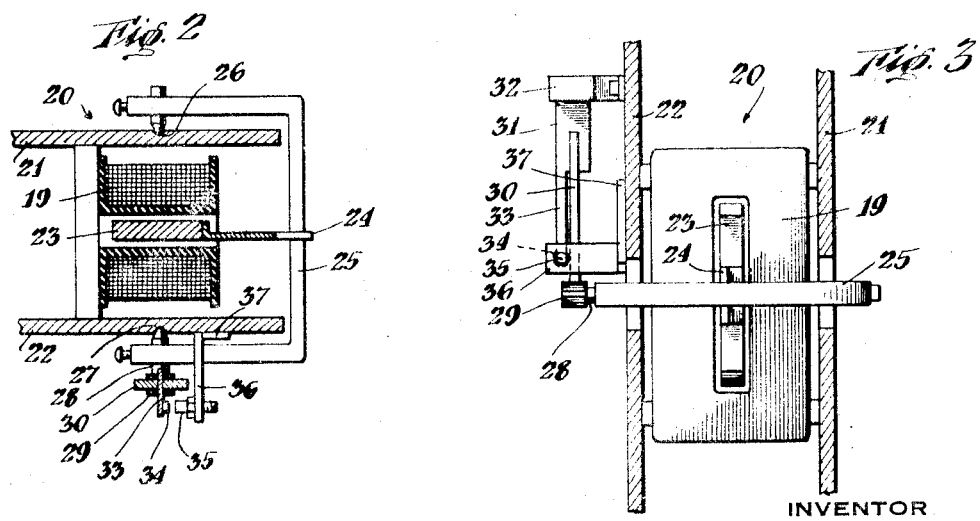

2,482,078

UNITED STATES PATENT OFFICE 2,482,078

CHLORINE CONCENTRATION LIMIT INDICATOR FOR CHLORINATING SYSTEMS

Charles F. Wallace, Westfield, N. J., assignor to Wallace & Tiernan Products, Inc., Belleville, N. J., a corporation of New Jersey Application July 13, 1946, Serial No. 683,327

3 Claims. (Cl. 346—33)

My present invention relates to a chlorine concentration limit indicator for a chlorinating system, and more particularly to apparatus for use in connection with a chlorine injection system for the chlorination of aqueous liquids, by which, when the chlorine supply to the system passes predetermined low or high limits, suitable indication will be provided, this indication preferably being of a type providing a permanent record of the time periods during which the chlorine supplied to the system is below or above some predetermined minimum or maximum value. The system preferably also affords an indication of an audible or visible nature or both for the same purpose.

Chlorinating systems are now in common use for chlorinating drinking water and also for chlorinating sewage, both of which are aqueous in character, such systems using apparatus such, for example, as that disclosed in my prior Patent No. 1,777,987 granted October 7, 1930. In systems of this character, gaseous chlorine may be supplied to a continuous flowing stream of water to make up a very concentrated solution of chlorine in water, and this solution, in turn, added to the much larger body of aqueous liquid to be chlorinated. Suitable means are usually provided for adjusting the rate of supply of chlorine to the stream of water to a value corresponding to the requirements for chlorine of the system, i. e., of the liquid to be chlorinated, this control being effected both in proportion to the rate of flow of the liquid to be chlorinated and to the requirements for chlorine of that liquid. However, as sometimes happens, the chlorine supply, which is usually from one or more tanks or cylinders of this gas under pressure, becomes exhausted, or for other reasons the flow of chlorine to the chlorinating means may be interrupted or restricted to a value which is much too low to afford adequate and proper chlorination. Inasmuch as adequate chlorination is closely associated with the health of the community operating the system, it becomes very important from the health standpoint to have a permanent record of times during which the supply of chlorine is inadequate and further becomes important to notify the operators of the system immediately the supply rate is too low, so that corrective measures may be promptly taken. For these reasons, while the system and apparatus according to the present invention is applicable to indicate either high or low limits of chlorine concentration, its major field of utility will be in low limit indication, which is therefore more particularly hereinafter described.

Various methods and apparatus have been worked out to detect the amount of chlorine in aqueous liquids subsequent to the chlorination thereof and particularly subsequent to the point at which chlorine is added and has had an opportunity to be effective, so that only the residual chlorine is detected. However, in such systems, the amount of residual chlorine is quite low, in the order of magnitude of one part per million or less, so that the chlorine sensitive means must be of particular types and highly sensitive in character. I have found that for the present purposes, as above outlined, means may be provided responsive to a relatively high concentration of chlorine in a relatively small stream of water added to the aqueous liquids to be chlorinated, which means are of different and much simpler character than those aforesaid and hence less liable to get out of order. At this point in the system, the chlorine concentration is a great many times greater than that of the residual chlorine in the liquid to be chlorinated (in practice, in the order of magnitude of 200 to 3,000 parts per million).

A primary object of the present invention, therefore, is to provide a chlorine-responsive system, which will indicate when the chlorine concentration becomes too low or too high and which will be responsive to quite high concentrations of chlorine, and to provide an associated system for indicating when the chlorine concentration falls below or increases above certain predetermined values.

A further and more specific object of the present invention is to provide a system of the character set forth, wherein the chlorine sensitive means is simple in character, little if any subject of getting out of order, and wherein the associated system is of a type which will be adequately sensitive to the high concentrations of chlorine to which the chlorine-sensitive means is exposed and will give an accurate indication of one or more types, including, for example, a permanent written record, a visible signal and an audible signal to indicate when the concentration of chlorine is below or above a predetermined value.

A further object of the present invention is to provide in a system of the character set forth for manually varying the minimum or maximum value of chlorine concentration to which the system will respond.

Other objects and advantages of the present invention will become apparent from the following specification and appended claims, when considered in connection with the accompanying drawings in which:

Figure 1 is a diagrammatic illustration of a system in accordance with the present invention, including an electric circuit connecting the various elements of the system, and showing the relation of all the parts;

Fig. 2 is a view in plan with parts broken away and in horizontal section of the sensitive relay means of Fig. 1;

Fig. 3 is a side elevation with some parts broken away and in vertical section of the structure of Fig. 2;

Fig. 4 is a front elevation of certain parts of the permanent record means for indicating a concentration of chlorine below the predetermined desired amount; and Fig. 5 is a view partly in vertical section and partly in elevation as seen from the right in Fig. 4 of the apparatus shown in that figure.

The system of the present invention is shown applied to a chlorine injection system, which may be of the type shown in my prior Patent No. 1,777,987, above referred to and which is also embodied to some extent in the disclosure of MacKay Patent No. 2,391,060, granted December 18, 1945. In accordance with the disclosure of those patents, aqueous liquid to be chlorinated may pass through a large main 1, in the direction of the arrow, as shown. There is also provided a branch pipe 2 for conducting a stream of water to the main 1, means being provided for adding to this stream of water a substantial concentration of chlorine, many times that required for the liquid in the main 1. The stream of water passing through the pipe 2 may come from any suitable source (not shown) and preferably is maintained at a constant rate, variations in demand for chlorine due to variations in either the rate of flow of the liquid through the main 1 or the variable demands of that liquid for chlorine or both being compensated for by varying the concentration of chlorine in the water flowing through the pipe 2. This chlorine is supplied from a chlorinator generally indicated at 3, which may be of a type as disclosed in one or the other of the patents above referred to, chlorine being supplied from the chlorinator 3 through a passage 4, to the throat portion 5 of a venturi in the pipe 2.

I have found that the concentration of chlorine in the pipe 2 is a proper condition to use as an index for determining when the chlorine being supplied is below a predetermined desired value and hence in accordance with the present invention use this concentration as the controlling condition.

By passing a predetermined portion or all of the liquid of the stream of water flowing through the pipe 2 on the downstream side of the Venturi throat 5 therein, through a chlorine sensitive cell, a good indication is had, based upon variations in the electrical conductivity of this liquid. This conductivity for concentrated aqueous solutions for chlorine is sufficiently indicative of that concentration to afford an accurate indication thereof. Very small concentrations of chlorine of the order of magnitude of residual chlorine in the main 1 does not have a sufficiently representative or sensitive effect upon the electrical conductivity of the liquid to give an accurate indication. Furthermore, in the case of sewage, there are so many other factors present affecting electrical conductivity, that such condition is not reliable. As shown, therefore, there is provided a cell generally indicated at 6, which is connected by by-pass passages 7 and 8 to spaced points along the pipe 2.

The cell 6 is very simple in character and comprises merely a pair of similar thimbles 9 of some metal which is a good electrical conductor and which is comparatively inert to chlorine and to aqueous solutions thereof, such as silver, interposed in spaced relation in a non-conducting tubular casing, which may be of hard rubber or some electrically non-conducting organic plastic material. The thimbles 9, which are spaced apart, as shown in the cell 6, are connected through line wires 10 and 11 in series in a circuit generally indicated at 12. Alternating current is caused to flow through this circuit, this type of current being preferred so as to prevent polarization of the electrodes, which might occur if direct current were used. Alternating current may be taken from any suitable source thereof through A. C. line wires 13, under control of a suitable switch diagrammatically indicated at 14 and then transformed down to a desired low voltage, such as 12 volts, by a conventional transformer 15. The secondary of this transformer 15 is in series in circuit 12. This circuit also includes in series relation therein a suitable rheostat 16, which is effective as hereinafter described, to vary the control point to which the system of the present invention is responsive. This rheostat may, for example, have a total resistance such as 10,000 ohms.

Means are provided responsive to the current flowing through circuit 12 for effecting a control. For this purpose it is desired to interpose a relay in this circuit which will be sensitively responsive to changes in current flow therein. For this purpose, I prefer to employ an instrument of the type generally disclosed in my Patent No. 2,341,834, granted February 15, 1944, entitled "Recording galvanometer," the instrument being varied as hereinafter set forth so that it will operate as a relay rather than as a galvanometer. As the coil of this instrument is intended to be responsive to a direct current flow, a full wave, bridge connected rectifier 17 is connected in series in circuit 12 as shown in Fig. 1. Across the output of this rectifier is a suitable condenser 18 which may have a value of about 50 mfd. The output of this rectifier is connected directly to the coil 19 of the relay instrument which is generally indicated at 20 and is shown in further detail in Figs. 2 and 3.

The instrument 20 comprises a stator formed as the coil 19 which is suitably supported from plates 21 and 22. The rotor of the instrument comprises a disc 23 which is preferably permanently magnetized and is of some magnetic material of high retentivity such as "Alnico." In view of the physical characteristics of this material, i. e., the difficulty of machining it, and also in view of the fact that the construction is made simpler by the arrangements provided, this rotor is secured as by soldering or welding a projection thereof, as shown at 24, to an offset portion 25 of the rotor support, which support is pivoted in any suitable manner as diagrammatically illustrated at 26 and 27 to the plates or frame members 21 and 22. Suitably secured to the forward end portion of the rotor support 25 is an axial stud 28 which carries a pinion 29. The pinion 29 meshes with complementary gear teeth formed on the lower end of a sector 30, which is connected by a flexible spring member 31 to a rigid supporting structure 32, movement of the sector 30 being permitted by the flexing of the member 31. The flexible spring member 31 has a depending portion 33 carrying adjacent to its lower end a switch contact 34, which is arranged to cooperate with a complementary switch contact 35 formed as a stud threaded through an upstanding ear 36 of a stationary contact supporting member 37. The stud forming contact 35 may be suitably adjusted in respect to the ear 36, and the adjustment secured by a lock nut as shown for determining the point at which the contacts 34 and 35 will engage one another to complete an electric circuit.

From the above, it will be seen that the current flow through the circuit 12 is varied by varying concentrations of chlorine in the water solution flowing through the pipe 2. This current flow directly influences the current flow through the coil 19 by reason of its being in series with the direct current terminals of the full wave, bridge connected rectifier 17. The rotor 23 of the instrument 20 will be positioned in accordance with the current flow through the coil 19 and hence will position the sector 30 proportionately through the pinion 29 and gear teeth on the lower end of this sector. The parts are adjusted so that when the concentration of chlorine in the water passing through the cell 6 falls below a certain predetermined amount, the current flow through the circuit 12 will correspondingly fall below a predetermined value and this in turn will cause a positioning of the rotor 23 so as to close the circuit between contacts 34 and 35, these contacts being otherwise and normally open. When it is desired to vary the control point of the system, the rheostat 16 may be adjusted for this purpose. A second way of effecting this adjustment is to vary the adjustment of the stud 35 in respect to the ear 36.

While it is possible and feasible to operate any one or more of the indicating means hereinafter described directly in response to the making or breaking of a circuit between the contact points 34—35, and the invention is to be considered as including such a combination, I have shown for the purposes of the present disclosure an arrangement in which there is a second relay, current through which is controlled by a circuit including the contact points 34 and 35. As shown, this second relay may be conventional in character and is indicated generally at 38. One side of the coil of the relay 38 is connected through a line 39 to a line 40 which leads to one of the line wires 13. The other side of the coil of relay 38 is connected through a line 41 to contact supporting member 37, which is in electrical connection with the contact point 35, but is suitably insulated from other parts of the apparatus. The contact point 34 is electrically connected through the spring portion 33 and 31 with the electrically conducting member 32. The member 32 is connected through a line 42 to the wire 43 which leads to the other side of the A. C. line 13. Thus the relay 38, which is an A. C. relay, is energized when contact is made between contacts 34 and 35, this being the second circuit of the system and under the control of the first relay instrument 20.

The third circuit is that controlled by the second relay 38 and includes a line 44 connected to the line 39 which is in turn connected through the wire 40 to one side of the A. C. supply line, the line 44 being connected to the movable contact 45 of the relay 38 as shown. The fixed contact 46 of this relay is connected by a line 47 in the third circuit which leads to the other side of the A. C. supply line in this case to line 43. Connected across the line in this circuit is a visible signal means here shown as a light 48 which may be suitably located to be visible to the operator of the apparatus. Also included in the third circuit is the primary of a transformer 49, by which the voltage may be stepped down to a desired point, for example to about six volts. Across the secondary of the transformer 49 there may be connected further indicating means such as an audible signal 50, shown diagrammatically herein but which may take the form of a buzzer or other audible means. Also connected across the secondary of the transformer 49 is a means by which a permanent record may be made of the time periods during which the chlorine concentration is below the desired control point or value. For this purpose it is preferred to use direct current to actuate the indicator. A full wave, bridge connected rectifier 51 is therefore provided across the secondary of the transformer 49 which has output leads 52 and 53 connected to a magnet coil 54 of a recording instrument generally indicated at 55, this instrument being in part illustrated in Fig. 1 and further illustrated in detail in Figs. 4 and 5. The instrument is so arranged that when current flows through the coil 54, a permanent record is made upon a moving chart, the chart being moved at a predetermined rate so that graduations thereon are indicative of the passage of time. The chart as normally used is synchronized with the time at the place where the system is located.

Considering now the instrument 55 and its operating means, there is provided as shown a circular disc type chart 56 which is replaceable at intervals and which in accordance with the present invention may be used for a substantial number of days by use of means hereinafter described. It will be understood of course that a roll type chart could be employed instead of the rotating disc chart as shown within the purview of the present invention. The replaceable disc, which is usually of paper, may be suitably secured to a rigid chart supporting member 57 which is arranged to be rotated by synchronous motor drive apparatus 58, this apparatus being connected across the A. C. supply line 13 by the wires 40—43 as shown. The disc 56 may be rotated at any given rate of speed, for example one revolution per 24 hours, and may be suitably marked in hours by radial lines as shown in Fig. 4. Arranged to be associated with the disc 56 is a marking device 59 such as a pen or other similar instrument. This device is carried upon the end of a depending arm 60, which in turn is rigid with a bracket member 61 threaded onto and rotatable about a lead screw 62. The lead screw is swivelly mounted in suitable bearings 63 and 64 and is provided at one end with a knob 65 by which it may be rotated. Also mounted for rocking movement about the axis of the lead screw 62 is a rigid frame including end members 66—67 connected by a cross bar 68. One end of the bracket member 61 extends upwardly and loosely embraces the cross bar 68 so that this bracket and the rigid frame 66—68 may be rocked simultaneously about the axis of the lead screw 62, while permitting endwise adjustive movement of the bracket 61 and the pen 59 by rotation of the lead screw. One of these end members, for example the member 66, is extended upwardly and connected by a pivoted link 69 with an actuating means, comprising a movable armature member 70 associated with the coil 54. The member 70 is connected by a resilient member 71 with a point 72 on the link 69. The member 70 is urged toward its open position by a tension spring 73 connecting the lower end of the spring 71 with a fixed anchorage 74. The armature 70 is mounted in respect to the rigid frame associated with the coil 54 by suitable means, permitting the movement of the member 70 in a substantially pivotal manner about the lower end portion thereof. In practice this may be effected as best shown in Fig. 1 by providing one or more holes through the member 70 through which extend headed members, as screws, which are fixed to the frame of the magnet 54 and pass loosely through the holes. Alternatively, a suitable hinge could be provided at this point.

It will be understood that when no current is flowing through the magnet coil 54, the member 70 will be held at the clockwise limit of its movement about its lower end portion by the tension of the spring 73, but when direct current is supplied to the coil 54, the parts are moved to the position shown in Fig. 5 at which the member 70 is moved counter-clockwise about its lower end portion, causing the spring member 71 to move the link 69 to the left, as seen in Fig. 5, and hence to rotate the frame 66—68 in a counter-clockwise direction about the axis of the lead screw 62 to move the marking pen 59 into engagement with the chart. This condition is maintained as long as current flows through the coil 54, which in turn is as long as current is flowing through the third circuit by reason of the energization of the second relay 38. This in turn is a condition which obtains as long as the second circuit, including contact points 34 and 35, are in engagement with one another. This condition in turn obtains as long as the concentration of chlorine in the water flowing through pipe 2 is below the predetermined minimum point to which the system is set by the adjustment of the rheostat 16 and the setting of contact point 35. When the chlorine concentration in the liquid in pipe 2 is adequate, i. e. as great as or greater than the desired minimum, the instrument 20 will move to open the contacts 34 and 35, this in turn will open the circuit to the second relay 38, which will permit contacts 45 and 46 in the third circuit to move to their normally open position as shown in Fig. 1 and will stop the operation of visible signal means 48 and audible signal means 50, and flow of current through the lines 52 and 53, so that the magnet coil 54 will be deenergized and the parts will resume their normal inoperative position shown in Fig. 1.

It will be understood that for any given adjustment of the lead screw 62 by the knob 65, the marking means 59 will be in position to make a line on the chart at a given radial distance from the center thereof. If the screw 62 is given such a turn that the different radial distances correspond, for example, to the days of the month, or some other arrangement, a single chart may be useful for a substantial period of time, for example a month, and will afford a permanent record during this entire period of the times during which chlorine concentration is below the desired amount. In this way it is unnecessary to change the chart every day and the records are kept accurate but at a minimum in volume.

While there is herein shown and described but one embodiment of the present invention, various modifications are suggested herein and will further present themselves to those skilled in the art. I do not wish to be limited, therefore, except by the scope of the appended claims, which are to be construed validly as broadly as the state of the prior art permits.

I claim:

1. In a system for continuously introducing a small concentration of chlorine into a relatively large flowing stream of aqueous liquid, said concentration being insufficient to affect the electrical conductivity of the liquid in a manner representative of the magnitude of said concentration, the combination, with conduit structure for establishing and discharging into said relatively large stream a minor flow of water quantitatively equalling a small fraction of said large stream, and with means introducing chlorine into the minor flow in a large concentration sufficient to provide the desired small concentration in the large stream, of a low limit indication system comprising a conductivity cell including electrode means exposed to the minor flow of water after introduction of chlorine thereto, a circuit supplying electric current through said cell, for variation of the amount of said current in response to change of conductivity of the chlorine-containing water flowing therethrough, and means connected to said circuit and responsive to current flow therein and including a recording device, operated in response to a decrease of said current representative of decrease of chlorine supply below a predetermined low limit, for making a record of the existence and duration of the decreased chlorine supply.

2. In a system for continuously introducing a small concentration of chlorine into a relatively large flowing stream of aqueous liquid, said concentration being insufficient to affect the electrical conductivity of the liquid in a manner representative of the magnitude of said concentration, the combination, with conduit structure for establishing and discharging into said relatively large stream a minor flow of water quantitatively equalling a small fraction of said large stream, and with means introducing chlorine into the minor flow in a large concentration sufficient to provide the desired small concentration in the large stream, of a concentration limit indication system comprising a conductivity cell including electrode means exposed to the minor flow of water after introduction of chlorine thereto, a circuit supplying electric current through said cell, for variation of the amount of said current in response to change of conductivity of the chlorine-containing water flowing therethrough, and means connected to said circuit and responsive to current flow therein and including a recording device, operated in response to a value of current in said circuit outside a predetermined range in one direction representative of a variation of chlorine supply outside a predetermined range thereof in one direction, for making a record of the existence and duration of the chlorine supply being outside said predetermined range in said one direction.

3. In a system for continuously introducing a small concentration of chlorine into a relatively large flowing stream of aqueous liquid, said concentration being insufficient to affect the electrical conductivity of the liquid in a manner representative of the magnitude of said concentration, the combination, with conduit structure for establishing and discharging into said relatively large stream a minor flow of water quantitatively equalling a small fraction of said large stream, and with means introducing chlorine into the minor flow in a large concentration sufficient to provide the desired small concentration in the large stream, of a low limit indication system comprising a conductivity cell including electrode means exposed to the minor flow of water after introduction of chlorine thereto, a circuit supplying electric current through said cell, for variation of the amount of said current in response to change of conductivity of the chlorine-containing water flowing therethrough, and means connected to said circuit and responsive to current flow therein and including an indicating device, operated in response to a decrease of said current representative of decrease of chlorine supply below a predetermined low limit, for giving an indication of the existence and duration of the decreased chlorine supply.

CHARLES F. WALLACE.

REFERENCES CITED

The following references are of record in the file of this patent:

UNITED STATES PATENTS

| Number | Name | Date |
| --- | --- | --- |
| 702,734 | Kelly and Tschinkel | June 17, 1902 |
| 1,450,023 | Edelman | Mar. 27, 1923 |